(12) United States Patent
Koskinen (10) Patent No.: US 9,727,947 B2
(45) Date of Patent: Aug. 8, 2017

(54) DOWNSCALING A DIGITAL RAW IMAGE FRAME

(71) Applicant: Microsoft Technology Licensing, LLC, Redmond, WA (US)

(72) Inventor: Samu Koskinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 14/665,907

(22) Filed: Mar. 23, 2015

(65) Prior Publication Data

US 2016/0284054 A1   Sep. 29, 2016

(51) Int. Cl.
*G06T 3/40* (2006.01)
*H04N 5/217* (2011.01)
*H04N 9/04* (2006.01)

(52) U.S. Cl.
CPC .......... *G06T 3/4015* (2013.01); *H04N 5/217* (2013.01); *H04N 9/045* (2013.01)

(58) Field of Classification Search
CPC combination set(s) only.
See application file for complete search history.

(56) References Cited

U.S. PATENT DOCUMENTS

| | | | |
|---|---|---|---|
| 6,809,765 B1* | 10/2004 | Tao | H04N 9/045 348/273 |
| 7,626,727 B2* | 12/2009 | Sugimori | H04N 1/40068 358/1.9 |
| 7,646,910 B1* | 1/2010 | Linzer | H04N 9/045 382/166 |
| 8,068,145 B1* | 11/2011 | Tovchigrechko | H04N 9/07 348/222.1 |
| 8,229,212 B2* | 7/2012 | Siddiqui | G06T 3/4007 348/265 |
| 8,446,484 B2 | 5/2013 | Muukki et al. | |
| 8,457,433 B2* | 6/2013 | Hong | G06T 3/4015 358/3.26 |
| 8,659,675 B2 | 2/2014 | Takahashi et al. | |
| 8,780,238 B2 | 7/2014 | Bowers | |
| 2003/0035056 A1* | 2/2003 | Chen | H04N 1/40012 348/273 |

(Continued)

FOREIGN PATENT DOCUMENTS

| | | |
|---|---|---|
| CN | 103491280 A | 1/2014 |
| EP | 2528319 A1 | 11/2012 |
| WO | 2014080068 A1 | 5/2014 |

OTHER PUBLICATIONS

"International Search Report and Written Opinion Issued in PCT Application No. PCT/US2016/019003", Mailed Date: May 6, 2016, 12 Pages.

(Continued)

*Primary Examiner* — Anand Bhatnagar (57) ABSTRACT

In one example, luminance information related to a digital raw image frame captured via a color filter array is obtained. Chrominance information related to the digital raw image frame is obtained. The obtained luminance information and chrominance information are downscaled to a target resolution, such that one of pixel data of the captured digital raw image frame and the obtained chrominance information has been demosaiced before the downscaling. The downscaled chrominance information is reverse-demosaiced.

20 Claims, 5 Drawing Sheets

(56) References Cited

U.S. PATENT DOCUMENTS

| | | | |
|---|---|---|---|
| 2005/0276475 A1* | 12/2005 | Sawada | H04N 1/648 |
| | | | 382/167 |
| 2006/0153474 A1* | 7/2006 | Ruggiero | G06T 1/20 |
| | | | 382/276 |
| 2007/0127095 A1* | 6/2007 | Sugimori | H04N 1/40068 |
| | | | 358/520 |
| 2008/0260291 A1 | 10/2008 | Alakarhu et al. | |
| 2010/0067789 A1 | 3/2010 | Cai et al. | |
| 2010/0104178 A1 | 4/2010 | Tamburrino et al. | |
| 2010/0214446 A1 | 8/2010 | Watarai | |
| 2012/0063682 A1 | 3/2012 | Alacoque | |
| 2013/0188065 A1 | 7/2013 | Wegener | |
| 2013/0321677 A1 | 12/2013 | Cote et al. | |
| 2014/0118582 A1* | 5/2014 | Artyomov | H04N 9/045 |
| | | | 348/242 |

OTHER PUBLICATIONS

Khashabi, et al., "Joint Demosaicing and Denoising via Learned Non-Parametric Random Fields", In Proceedings of IEEE Transactions on Image Processing, Jul. 2013, pp. 1-14.

* cited by examiner

DOWNSCALING A DIGITAL RAW IMAGE FRAME

BACKGROUND

Various digital video cameras and mobile apparatuses, such as smartphones and tablet computers incorporating digital cameras, may often utilize image sensors with a large amount of pixels. To facilitate processing of image frames produced with such image sensors, the image frames may be downscaled at some point in the image processing pipe. However, perceived image quality may be deteriorated by such downscaling.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, a method comprises obtaining luminance information related to a digital raw image frame captured via a color filter array; obtaining chrominance information related to the digital raw image frame; downscaling the obtained luminance information and the chrominance information to a target resolution, one of pixel data of the captured digital raw image frame and the obtained chrominance information having been demosaiced before the downscaling; and reverse-demosaicing the downscaled chrominance information.

In another example an apparatus and a computer-readable storage medium have been discussed along with the features of the method.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although some of the present examples may be described and illustrated herein as being implemented in a mobile phone, a smartphone or a tablet computer, these are only examples of an apparatus and not a limitation. As those skilled in the art will appreciate, the present examples are suitable for application in a variety of different types of apparatuses incorporating a stand-alone digital camera device, e.g. a compact camera, a SLR camera, or a stand-alone digital video camera device.

Figure 1:
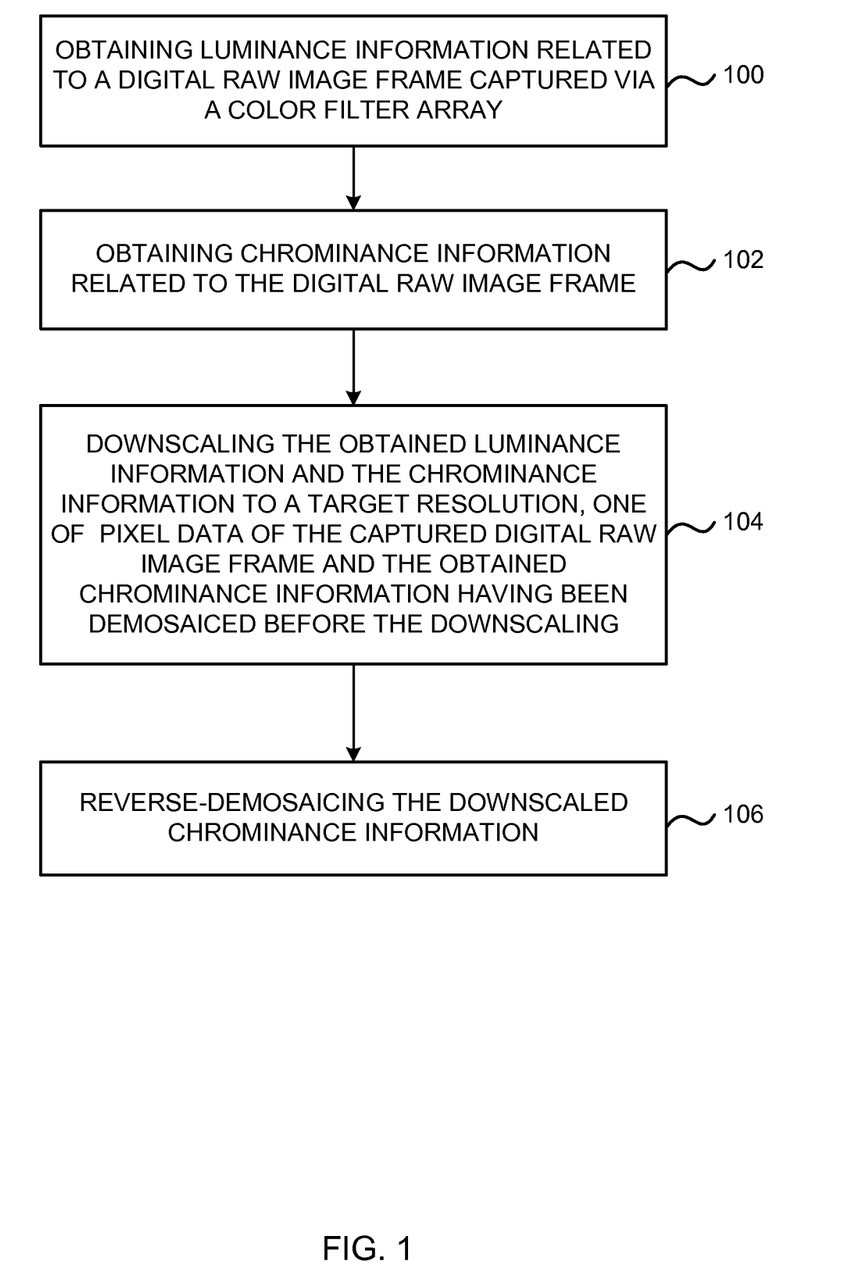
FIG. 1 is a flow diagram of one example of a method.

FIG. 1 shows a method which can be used to downscale a digital raw image frame. At step 100, luminance information related to a digital raw image frame captured via a color filter array (CFA) is obtained. In one example, the color filter array may comprise a Bayer filter array or the like. In another example, the color filter array may comprise a RGBW (red, green, blue, white) based filter array or the like. The captured digital raw image frame has a resolution of a given amount of pixels. Herein, a 'raw' image frame refers to an image frame that contains minimally processed data from an image sensor of a digital camera or the like.

Chrominance information related to the digital raw image frame is obtained, step 102. The obtained luminance information and chrominance information are downscaled to a target resolution, step 104. In one example, the target resolution may vary between substantially one half of the resolution of the captured digital raw image frame and substantially one quarter of the resolution of the captured digital raw image frame. In one example, the downscaling the luminance information and chrominance information may utilize e.g. one of bicubic downscaling and bilinear downscaling.

One of pixel data of the captured digital raw image frame and the obtained chrominance information has been demosaiced before the downscaling. In one example, the demosaicing may utilize e.g. bilinear interpolation. The downscaled chrominance information is reverse-demosaiced, step 106.

Figure 2:
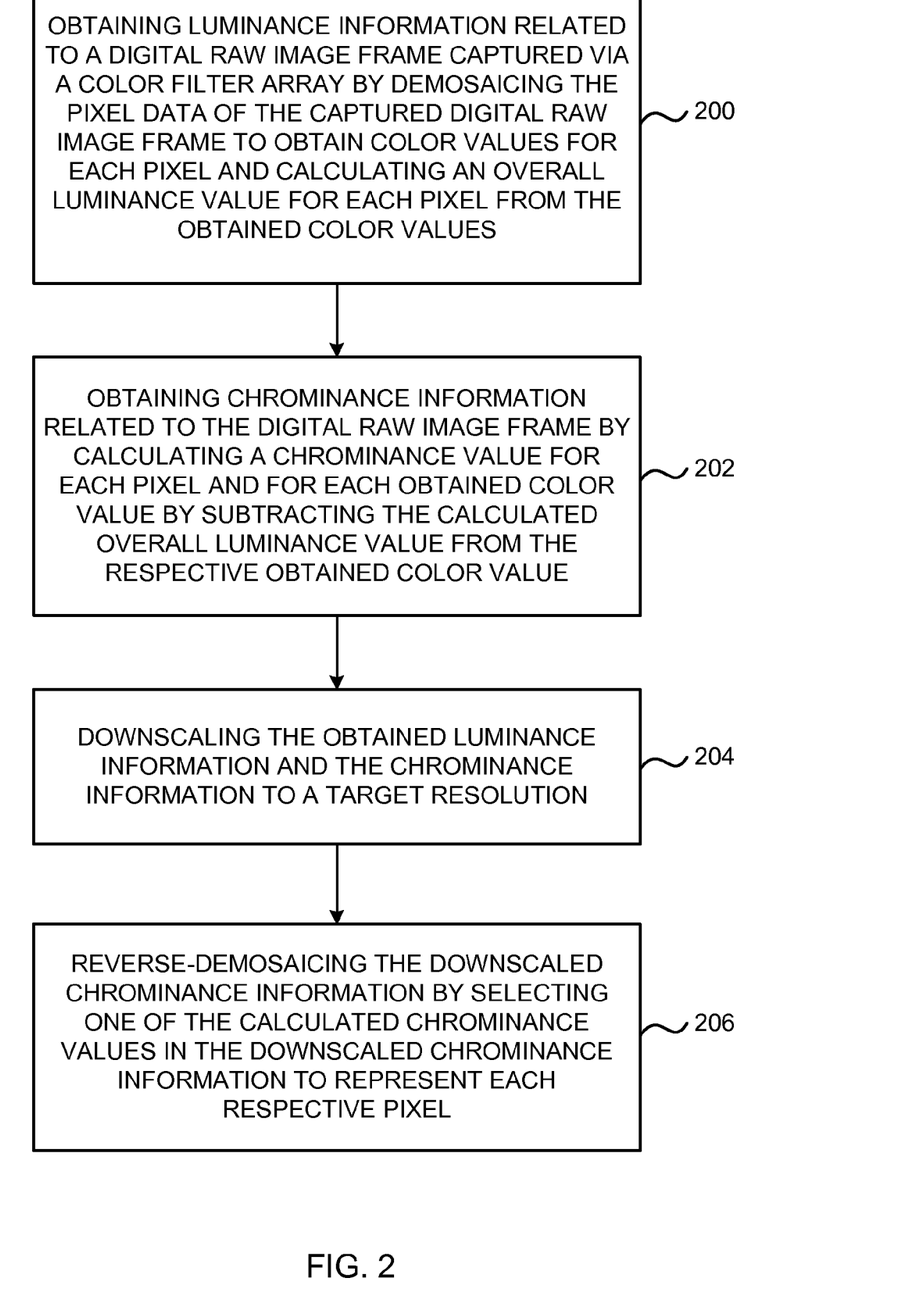
FIG. 2 is a flow diagram of another example of a method.

FIG. 2 shows a method which can be used to downscale a digital raw image frame. At step 200, luminance information related to a digital raw image frame captured via a color filter array (CFA) is obtained. In the example of FIG. 2, the obtaining the luminance information comprises demosaicing the pixel data of the captured digital raw image frame to obtain color values for each pixel, and then calculating an overall luminance value for each pixel from the obtained color values. In one example, the demosaicing may utilize e.g. bilinear interpolation.

In one example, the calculating the overall luminance value may be performed according to e.g. Y=0.299*R+0.587*G+0.114*B, in which Y represents the overall luminance value for a pixel, R represents the obtained red color value for the pixel, G represents the obtained green color value for the pixel, and B represents the obtained blue color value for the pixel.

In one example, the color filter array may comprise a Bayer filter array or the like. In another example, the color filter array may comprise a RGBW (red, green, blue, white) based filter array or the like. The captured digital raw image frame has a resolution of a given amount of pixels. Herein, a 'raw' image frame refers to an image frame that contains minimally processed data from an image sensor of a digital camera or the like.

Chrominance information related to the digital raw image frame is obtained, step 202. In the example of FIG. 2, the obtaining the chrominance information comprises calculating a chrominance value for each pixel and for each obtained color value by subtracting the calculated overall luminance value from the respective obtained color value.

In one example, the calculating the chrominance value for each pixel and for each obtained color value may be performed by subtracting the calculated overall luminance value from the respective obtained color value, such that e.g. R'=R-Y, G'=G-Y, and B'=B-Y, in which Y represents the calculated overall luminance value for a pixel, R represents the obtained red color value for the pixel, G represents the obtained green color value for the pixel, and B represents the obtained blue color value for the pixel, R' represents a chrominance value for the obtained red color value for a pixel, G' represents a chrominance value for the obtained green color value for the pixel, and B' represents a chrominance value for the obtained blue color value for the pixel.

The obtained luminance information and chrominance information are downscaled to a target resolution, step 204. In one example, the target resolution may vary between substantially one half of the resolution of the captured digital raw image frame and substantially one quarter of the resolution of the captured digital raw image frame. In one example, the downscaling the luminance information and chrominance information may utilize e.g. one of bicubic downscaling and bilinear downscaling.

The downscaled chrominance information is reverse-demosaiced, step 206. In one example, the reverse demosaicing may comprise selecting one of the calculated chrominance values in the downscaled chrominance information to represent each respective pixel.

Figure 3:
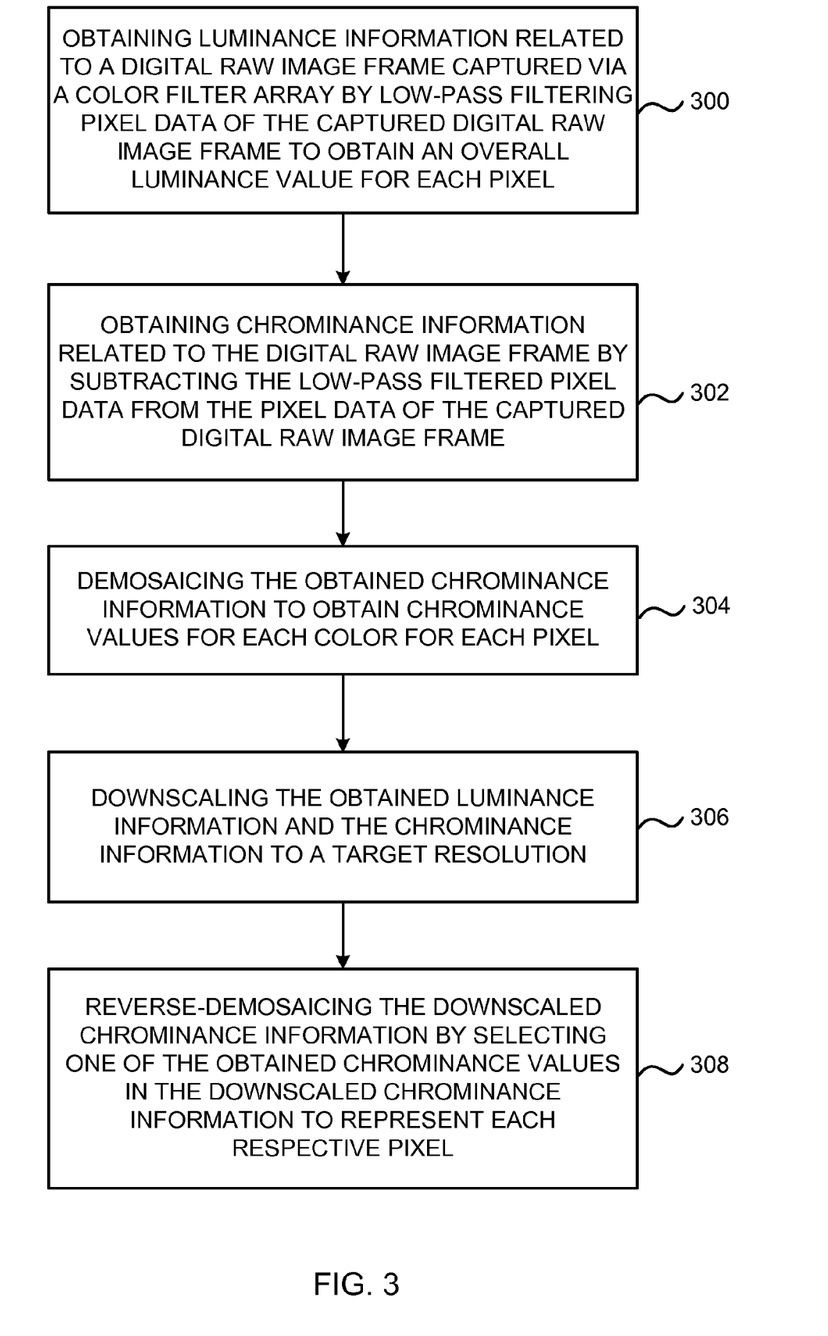
FIG. 3 is a flow diagram of another example of a method.

FIG. 3 shows a method which can be used to downscale a digital raw image frame. At step 300, luminance information related to a digital raw image frame captured via a color filter array (CFA) is obtained. In the example of FIG. 3, the obtaining the luminance information comprises low-pass filtering pixel data of the captured digital raw image frame to obtain an overall luminance value for each pixel.

In one example, the color filter array may comprise a Bayer filter array or the like. In another example, the color filter array may comprise a RGBW (red, green, blue, white) based filter array or the like. The captured digital raw image frame has a resolution of a given amount of pixels. Herein, a 'raw' image frame refers to an image frame that contains minimally processed data from an image sensor of a digital camera or the like.

Chrominance information related to the digital raw image frame is obtained, step 302. In the example of FIG. 3, the obtaining the chrominance information may comprise subtracting the low-pass filtered pixel data from the pixel data of the captured digital raw image frame. Alternatively, the obtaining the chrominance information may comprise high-pass filtering the pixel data of the captured digital raw image frame.

At step 304, the obtained chrominance information is demosaiced to obtain chrominance values for each color for each pixel. In one example, the demosaicing may utilize e.g. bilinear interpolation.

The obtained luminance information and chrominance information are downscaled to a target resolution, step 306. In one example, the target resolution may vary between substantially one half of the resolution of the captured digital raw image frame and substantially one quarter of the resolution of the captured digital raw image frame. In one example, the downscaling the luminance information and chrominance information may utilize e.g. one of bicubic downscaling and bilinear downscaling.

The downscaled chrominance information is reverse-demosaiced, step 308. In one example, the reverse demosaicing may comprise selecting one of the obtained chrominance values in the downscaled chrominance information to represent each respective pixel.

Figure 4:
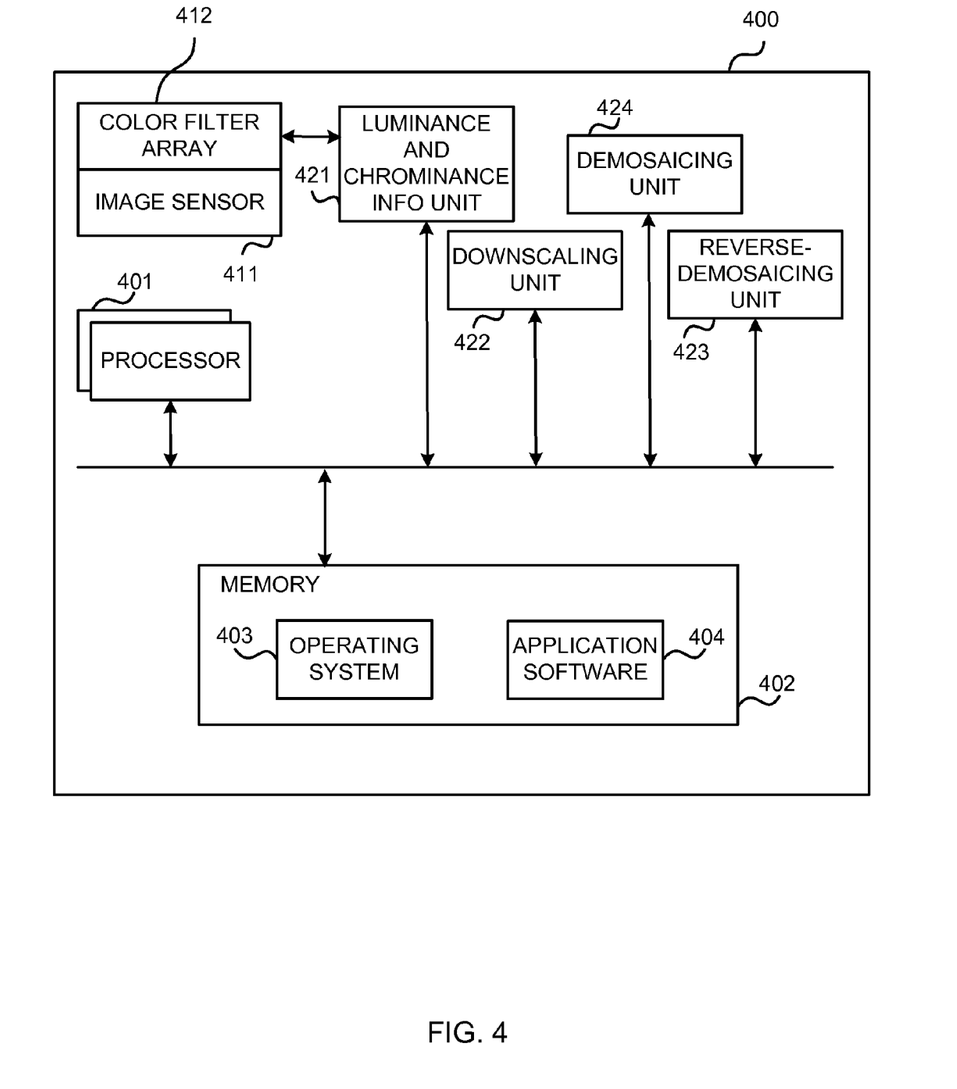
FIG. 4 is a block diagram of one example of an apparatus.

FIG. 4 shows a block diagram of one example of an apparatus 400 which may be implemented as any form of a computing device and/or electronic device that incorporates a digital image capture unit. For example, the apparatus 400 may be implemented as a mobile phone, a smartphone, or a tablet computer. Alternatively, the apparatus 400 may be implemented e.g. as a stand-alone digital camera device, e.g. a compact camera, a SLR camera, or a stand-alone digital video camera device.

The apparatus 400 comprises an image sensor 411. The apparatus 400 further comprises a color filter array 412 that is arranged in connection with the image sensor 411. In one example, the image sensor 411 may comprise a charge-coupled device (CCD) sensor or a complementary metal-oxide-semiconductor (CMOS) sensor, or the like. In one example, the color filter array 412 may comprise a Bayer filter array or the like. In another example, the color filter array 412 may comprise a RGBW (red, green, blue, white) based filter array or the like.

The apparatus 400 further comprises a luminance and chrominance information unit 421. The luminance and chrominance information unit 421 is configured to obtain luminance information related to a digital raw image frame captured via a color filter array, and to obtain chrominance information related to the digital raw image frame.

The apparatus 400 further comprises a downscaling unit 423. The downscaling unit 423 is configured to downscale (utilizing e.g. bicubic downscaling or bilinear downscaling) the obtained luminance information and the chrominance information to a target resolution, wherein one of pixel data of the captured digital raw image frame and the obtained chrominance information has been demosaiced before the downscaling.

The apparatus 400 further comprises a reverse-demosaicing unit 423. The reverse-demosaicing unit 423 is configured to reverse-demosaic the downscaled chrominance information.

In one example, the luminance and chrominance information unit 421 may be configured to obtain the luminance information by demosaicing (utilizing e.g. bilinear interpolation) the pixel data of the captured digital raw image frame to obtain color values for each pixel, and calculating an overall luminance value for each pixel from the obtained color values. The luminance and chrominance information unit 421 may be further configured to calculate the overall luminance value according to e.g. Y=0.299*R+0.587*G+0.114*B, in which Y represents the overall luminance value for a pixel, R represents the obtained red color value for the pixel, G represents the obtained green color value for the pixel, and B represents the obtained blue color value for the pixel. The luminance and chrominance information unit 421 may be further configured to obtain the chrominance information by calculating a chrominance value for each pixel and for each obtained color value by subtracting the calculated overall luminance value from the respective obtained color value, e.g. such that R'=R-Y, G'=G-Y, and B'=B-Y, in which Y represents the calculated overall luminance value for a pixel, R represents the obtained red color value for the pixel, G represents the obtained green color value for the pixel, and B represents the obtained blue color value for the pixel, R' represents a chrominance value for the obtained red color value for a pixel, G' represents a chrominance value for the obtained green color value for the pixel, and B' represents a chrominance value for the obtained blue color value for the pixel. The reverse-demosaicing unit 423 may be configured to perform the reverse-demosaicing by selecting one of the calculated chrominance values in the downscaled chrominance information to represent each respective pixel.

In another example, the luminance and chrominance information unit 421 may be configured to obtain the luminance information by low-pass filtering pixel data of the captured digital raw image frame to obtain an overall luminance value for each pixel. The luminance and chrominance information unit 421 may be further configured to obtain the chrominance information by subtracting the low-pass filtered pixel data from the pixel data of the captured digital raw image frame. The apparatus may further comprise a demosaicing unit 424. The demosaicing unit 424 is configured to demosaic the obtained chrominance information to obtain chrominance values for each color for each pixel utilizing e.g. bilinear interpolation. Here, the reverse-demosaicing unit 423 may be configured to perform the reverse-demosaicing by selecting one of the obtained chrominance values in the downscaled chrominance information to represent each respective pixel.

The apparatus 400 may comprise one or more processors 401 which may be microprocessors, controllers or any other suitable type of processors for processing computer executable instructions to control the operation of the apparatus 400. Platform software comprising an operating system 403 or any other suitable platform software may be provided at the apparatus 400 e.g. to enable application software 404 to be executed on the device.

Figure 5:
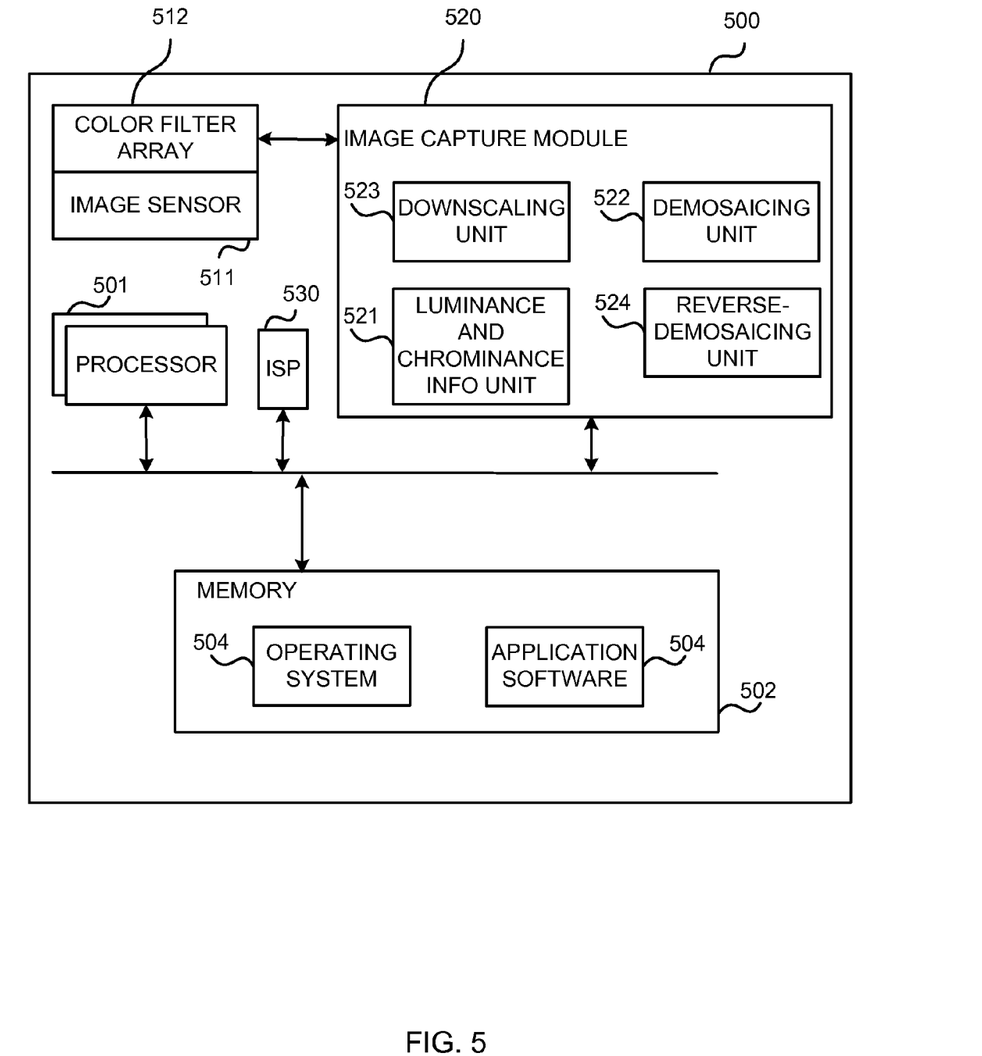
FIG. 5 is a block diagram of another example of an apparatus.

FIG. 5 shows a block diagram of one example of an apparatus 500 which may be implemented as any form of a computing device and/or electronic device that provides a network based storage service. For example, the apparatus 500 may be implemented as a mobile phone, a smartphone, or a tablet computer. Alternatively, the apparatus 500 may be implemented e.g. as a stand-alone digital camera device, e.g. a compact camera, a SLR camera, or a stand-alone digital video camera device.

In the example of FIG. 5, the apparatus 500 comprises an image capture module 520. The luminance and chrominance information unit 521, the demosaicing unit 522, the downscaling unit 523 and the reverse-demosaicing unit 524 are comprised in the image capture module 520.

The apparatus 500 further comprises an image signal processor (ISP) 530. The image signal processor 530 may be configured to receive the captured digital raw image frame after it has been processed by one of the examples of FIGS. 1-5, and to perform further processing on it.

In the example of FIG. 5, the functionalities of the image sensor 511, the color filter array 512, the luminance and chrominance information unit 521, the demosaicing unit 522, the downscaling unit 523, the reverse-demosaicing unit 524, the one or more processors 501, and the memory 502 are substantially similar to those of their counterparts in the example of FIG. 4, so their descriptions are not repeated here.

Computer executable instructions may be provided using any computer-readable media that is accessible by the apparatuses 400, 500. Computer-readable media may include, for example, computer storage media such as memories 402, 502 and communications media. Computer storage media, such as memories 402, 502, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memories 402, 502) is shown within the apparatuses 400, 500 it will be appreciated that the storage may be distributed or located remotely and accessed via a network or other communication link.

At least in some of the examples disclosed in FIGS. 1-5, in cases of having R, G and B (red, green and blue) information for each pixel, in the reverse-demosaicing only one of the chrominance channels is selected to represent each pixel. The selection may be done so that the final image will have e.g. a Bayer pattern. In other words, the final image will have pixels e.g. like this:

$$
\begin{array}{cccccc}
G & R & G & R & G & R & \ldots \\
B & G & B & G & B & G & \ldots \\
G & R & G & R & G & R & \ldots \\
B & G & B & G & B & G & \ldots \\
\end{array}
$$

Above, R, G, and B refer to chrominance channels that are like R, G and B but without the luminance information, i.e. contain only chrominance data.

At least some of the examples disclosed in FIGS. 1-5 are able to provide downscaling of a digital raw image frame such that perceived image quality remains high, yet the data size of the image frame decreases significantly which may be beneficial e.g. with processing high frame rate video. For example, in the case of 4K video, at least some of the examples disclosed in FIGS. 1-5 are able to downscale 4K (ultra high-definition) video frames of 8 megapixels to HD (high-definition) video frames of 2 megapixels with perceived image quality remaining high. Furthermore, at least some of the examples disclosed in FIGS. 1-5 are able to downscale HD (high-definition) video frames of 2 megapixels to WVGA (wide video graphics array) video frames of approximately 0.4 megapixels with perceived image quality remaining high.

At least some of the examples disclosed in FIGS. 1-5 are able to provide comparable luminance resolution as that of the originally captured digital raw image frame but reduced bandwidth. At least some of the examples disclosed in FIGS. 1-5 are able to provide downscaled digital raw image frames that can be used as input for an image processing pipe, such as e.g. the ISP 530 of FIG. 5.

An embodiment of a method comprises obtaining luminance information related to a digital raw image frame captured via a color filter array; obtaining chrominance information related to the digital raw image frame; downscaling the obtained luminance information and the chrominance information to a target resolution, one of pixel data of the captured digital raw image frame and the obtained chrominance information having been demosaiced before the downscaling; and reverse-demosaicing the downscaled chrominance information.

In an embodiment, alternatively or in addition, the obtaining the luminance information comprises demosaicing the pixel data of the captured digital raw image frame to obtain color values for each pixel; and calculating an overall luminance value for each pixel from the obtained color values.

In an embodiment, alternatively or in addition, the calculating the overall luminance value is performed according to Y=0.299*R+0.587*G+0.114*B, in which Y represents the overall luminance value for a pixel, R represents the obtained red color value for the pixel, G represents the obtained green color value for the pixel, and B represents the obtained blue color value for the pixel.

In an embodiment, alternatively or in addition, the obtaining the chrominance information comprises calculating a chrominance value for each pixel and for each obtained color value by subtracting the calculated overall luminance value from the respective obtained color value.

In an embodiment, alternatively or in addition, the reverse demosaicing comprises selecting one of the calculated chrominance values in the downscaled chrominance information to represent each respective pixel.

In an embodiment, alternatively or in addition, the obtaining the luminance information comprises low-pass filtering pixel data of the captured digital raw image frame to obtain an overall luminance value for each pixel.

In an embodiment, alternatively or in addition, the obtaining the chrominance information comprises subtracting the low-pass filtered pixel data from the pixel data of the captured digital raw image frame.

In an embodiment, alternatively or in addition, the method further comprises demosaicing the obtained chrominance information to obtain chrominance values for each color for each pixel.

In an embodiment, alternatively or in addition, the reverse demosaicing comprises selecting one of the obtained chrominance values in the downscaled chrominance information to represent each respective pixel.

An embodiment of an apparatus comprises a luminance and chrominance information unit configured to obtain luminance information related to a digital raw image frame captured via a color filter array, and to obtain chrominance information related to the digital raw image frame; a downscaling unit configured to downscale the obtained luminance information and the chrominance information to a target resolution, one of pixel data of the captured digital raw image frame and the obtained chrominance information having been demosaiced before the downscaling; and a reverse-demosaicing unit configured to reverse-demosaic the downscaled chrominance information.

In an embodiment, alternatively or in addition, the luminance and chrominance information unit is configured to obtain the luminance information by demosaicing the pixel data of the captured digital raw image frame to obtain color values for each pixel, and calculating an overall luminance value for each pixel from the obtained color values.

In an embodiment, alternatively or in addition, the luminance and chrominance information unit is configured to calculate the overall luminance value according to Y=0.299*R+0.587*G+0.114*B, in which Y represents the overall luminance value for a pixel, R represents the obtained red color value for the pixel, G represents the obtained green color value for the pixel, and B represents the obtained blue color value for the pixel In an embodiment, alternatively or in addition, the luminance and chrominance information unit is configured to obtain the chrominance information by calculating a chrominance value for each pixel and for each obtained color value by subtracting the calculated overall luminance value from the respective obtained color value.

In an embodiment, alternatively or in addition, the reverse-demosaicing unit is configured to perform the reverse-demosaicing by selecting one of the calculated chrominance values in the downscaled chrominance information to represent each respective pixel.

In an embodiment, alternatively or in addition, the luminance and chrominance information unit is configured to obtain the luminance information by low-pass filtering pixel data of the captured digital raw image frame to obtain an overall luminance value for each pixel.

In an embodiment, alternatively or in addition, the luminance and chrominance information unit is configured to obtain the chrominance information by subtracting the low-pass filtered pixel data from the pixel data of the captured digital raw image frame.

In an embodiment, alternatively or in addition, the apparatus further comprises a demosaicing unit configured to demosaic the obtained chrominance information to obtain chrominance values for each color for each pixel.

In an embodiment, alternatively or in addition, the reverse-demosaicing unit is configured to perform the reverse-demosaicing by selecting one of the obtained chrominance values in the downscaled chrominance information to represent each respective pixel.

In an embodiment, alternatively or in addition, the color filter array comprises a bayer filter array.

An embodiment of a computer-readable storage medium comprises executable instructions for causing at least one processor of an apparatus to perform operations comprising: obtaining luminance information related to a digital raw image frame captured via a color filter array; obtaining chrominance information related to the digital raw image frame; downscaling the obtained luminance information and the chrominance information to a target resolution, one of pixel data of the captured digital raw image frame and the obtained chrominance information having been demosaiced before the downscaling; and reverse-demosaicing the downscaled chrominance information.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A method, comprising:
    obtaining luminance information related to a digital raw image frame captured via a color filter array;
    obtaining chrominance information related to the digital raw image frame;
    downscaling the obtained luminance information and the chrominance information to a target resolution, one of pixel data of the captured digital raw image frame and the obtained chrominance information having been demosaiced before the downscaling; and
    reverse-demosaicing the downscaled chrominance information.

2. The method as claimed in claim 1, wherein the obtaining the luminance information comprises:
    demosaicing the pixel data of the captured digital raw image frame to obtain color values for each pixel; and
    calculating an overall luminance value for each pixel from the obtained color values.

3. The method as claimed in claim 2, wherein the calculating the overall luminance value is performed according to $Y=0.299*R+0.587*G+0.114*B$, in which Y represents the overall luminance value for a pixel, R represents the obtained red color value for the pixel, G represents the obtained green color value for the pixel, and B represents the obtained blue color value for the pixel.

4. The method as claimed in claim 2, wherein the obtaining the chrominance information comprises calculating a chrominance value for each pixel and for each obtained color value by subtracting the calculated overall luminance value from the respective obtained color value.

5. The method as claimed in claim 4, wherein the reverse demosaicing comprises selecting one of the calculated chrominance values in the downscaled chrominance information to represent each respective pixel.

6. The method as claimed in claim 1, wherein the obtaining the luminance information comprises low-pass filtering pixel data of the captured digital raw image frame to obtain an overall luminance value for each pixel.

7. The method as claimed in claim 6, wherein the obtaining the chrominance information comprises subtracting the low-pass filtered pixel data from the pixel data of the captured digital raw image frame.

8. The method as claimed in claim 7, further comprising demosaicing the obtained chrominance information to obtain chrominance values for each color for each pixel.

9. The method as claimed in claim 1, wherein the target resolution ranges between substantially one half to one quarter of a resolution of the digital raw image.

10. An apparatus, comprising:
    memory; and
    one or more processors configured for:

obtaining luminance information related to a digital raw image frame captured via a color filter array, and to obtain chrominance information related to the digital raw image frame, downscaling the obtained luminance information and the chrominance information to a target resolution, one of pixel data of the captured digital raw image frame and the obtained chrominance information having been demosaiced before the downscaling, and after said downscaling, reverse-demosaicing the downscaled chrominance information.

11. The apparatus as claimed in claim 10, wherein the the one or more processors are further configured for obtaining the luminance information by demosaicing the pixel data of the captured digital raw image frame to obtain color values for each pixel, and calculating an overall luminance value for each pixel from the obtained color values.

12. The apparatus as claimed in claim 11, wherein the one or more processors are further configured for calculating the overall luminance value according to Y=0.299*R+ 0.587*G+0.114*B, in which Y represents the overall luminance value for a pixel, R represents the obtained red color value for the pixel, G represents the obtained green color value for the pixel, and B represents the obtained blue color value for the pixel.

13. The apparatus as claimed in claim 11, wherein the one or more processors are further configured for obtaining the chrominance information by calculating a chrominance value for each pixel and for each obtained color value by subtracting the calculated overall luminance value from the respective obtained color value.

14. The apparatus as claimed in claim 13, wherein the one or more processors are further configured for performing the reverse-demosaicing by selecting one of the calculated chrominance values in the downscaled chrominance information to represent each respective pixel.

15. The apparatus as claimed in claim 10, wherein the one or more processors are further configured for obtaining the luminance information by low-pass filtering pixel data of the captured digital raw image frame to obtain an overall luminance value for each pixel.

16. The apparatus as claimed in claim 15, wherein the one or more processors are further configured for obtaining the chrominance information by subtracting the low-pass filtered pixel data from the pixel data of the captured digital raw image frame.

17. The apparatus as claimed in claim 16, wherein the one or more processors are further configured for demosaicing the obtained chrominance information to obtain chrominance values for each color for each pixel.

18. The apparatus as claimed in claim 17, wherein the reverse-demosaicing is performed by selecting one of the obtained chrominance values in the downscaled chrominance information to represent each respective pixel.

19. The apparatus as claimed in claim 10, wherein the color filter array comprises a bayer filter array.

20. A computer-readable storage medium comprising executable instructions for causing at least one processor of an apparatus to perform operations comprising:

obtaining luminance information related to a digital raw image frame captured via a color filter array;

obtaining chrominance information related to the digital raw image frame;

downscaling the obtained luminance information and the chrominance information to a target resolution, one of pixel data of the captured digital raw image frame and the obtained chrominance information having been demosaiced before the downscaling; and reverse-demosaicing the downscaled chrominance information.

* * * * *